(12) United States Patent
Tsuda et al.

(10) Patent No.: US 10,609,241 B2
(45) Date of Patent: Mar. 31, 2020

(54) IMAGE FORMING SYSTEM, SERVER, AND IMAGE FORMING APPARATUS FOR UPDATING INTERNAL DATA OF AN EXTERNAL DEVICE DIRECTLY CONNECTED TO THE IMAGE FORMING APPARATUS

(71) Applicant: KYOCERA Document Solutions Inc., Osaka (JP)

(72) Inventors: Keiji Tsuda, Osaka (JP); Masafumi Sato, Osaka (JP); Zhenyu Sun, Osaka (JP); Tatsuya Hiwatari, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/264,192

(22) Filed: Jan. 31, 2019

(65) Prior Publication Data

US 2019/0238707 A1    Aug. 1, 2019

(30) Foreign Application Priority Data

Jan. 31, 2018    (JP) ................................ 2018-014624

(51) Int. Cl.
*H04N 1/00* (2006.01)
*H04N 1/44* (2006.01)

(52) U.S. Cl.
CPC ..... *H04N 1/00938* (2013.01); *H04N 1/00244* (2013.01); *H04N 1/00326* (2013.01); *H04N 1/00344* (2013.01); *H04N 1/4426* (2013.01); *H04N 2201/0094* (2013.01)

(58) Field of Classification Search
CPC .......... H04N 1/00938; H04N 1/00244; H04N 1/00344; H04N 1/4426; H04N 1/00326; H04N 2201/0094
USPC ........................................................ 358/1.13
See application file for complete search history.

(56) References Cited

U.S. PATENT DOCUMENTS

| | | | | |
|---|---|---|---|---|
| 8,982,374 B2 * | 3/2015 | Oguma | ................. | G06F 21/305 358/1.13 |
| 10,095,454 B1 * | 10/2018 | Kamada | ................. | G06F 3/1261 |
| 2012/0192264 A1 * | 7/2012 | Sugiyama | .......... | G03G 15/5091 726/16 |
| 2012/0287465 A1 * | 11/2012 | Mizoguchi | ............ | G06F 3/1204 358/1.15 |
| 2014/0376050 A1 * | 12/2014 | Baba | ................... | H04N 1/00307 358/1.15 |

(Continued)

FOREIGN PATENT DOCUMENTS

JP    2017-167844 A    9/2017

*Primary Examiner* — Allen H Nguyen
(74) *Attorney, Agent, or Firm* — Hawaii Patent Services; Nathaniel K. Fedde; Kenton N. Fedde (57) ABSTRACT

Provided is an image forming system capable of updating internal data of an external device according to an instruction from a server. An app-installing unit installs an application for updating internal data of card reader in an image forming apparatus. An internal-data-updating unit causes the image forming apparatus to execute the application installed by the app-installing unit. An app-acquiring unit acquires the application from the server according to an instruction from the server. An app-executing unit executes the app acquired by the app-acquiring unit and updates the external device to the internal data. As a result, the internal data of the card reader is updated.

3 Claims, 7 Drawing Sheets

(56) References Cited

U.S. PATENT DOCUMENTS

2017/0052587 A1\* 2/2017 Eun .......................... G06F 1/32
2017/0315799 A1\* 11/2017 Kawaguchi ............. H04N 1/00

\* cited by examiner

IMAGE FORMING SYSTEM, SERVER, AND IMAGE FORMING APPARATUS FOR UPDATING INTERNAL DATA OF AN EXTERNAL DEVICE DIRECTLY CONNECTED TO THE IMAGE FORMING APPARATUS

INCORPORATION BY REFERENCE

This application is based on and claims the benefit of priority from Japanese Patent Application No. 2018-014624 filed on Jan. 31, 2018, the contents of which are hereby incorporated by reference.

BACKGROUND

The present disclosure relates to an image forming system, a server, and an image forming apparatus, and in particular, to an image forming system, a server, and an image forming apparatus for updating internal data of an external device directly connected to the image forming apparatus.

Conventionally, there are image forming apparatuses such as a multifunctional peripheral (MFP) and the like capable of printing documents and images.

Of such image forming apparatuses, there are image forming apparatuses to which a card reading device (hereinafter referred to as "card reader") for reading a card medium (hereinafter simply referred to as "card") may be directly connected by a USB (Universal Serial Bus) or the like. The card may be an RFID (Radio Frequency Identifier) card for performing user authentication, an IC card, a magnetic card, and the like. There is also an image forming system that includes such an image forming apparatus and a server that acquires information on the card and performs billing, maintenance management and the like.

In a typical technology, there is an image forming apparatus that reliably performs updates of firmware that is one type of internal data of the card reader without trouble regardless of an energy saving state. In an apparatus of typical technology, a first power management unit and a second power management unit (power management unit) update the power usage state of a main unit (first unit) and operation unit (second unit) to a state in which at least a firmware-update-control unit can execute a firmware update process. Then, a communication-control unit (communication unit) of the operation unit establishes communication between a firmware-distribution-server apparatus (firmware-distribution unit) and the operation unit. Furthermore, when a firmware update request is received from the firmware-distribution server apparatus to update the firmware of the card reader (acquisition unit), the firmware-update-control unit performs the firmware update process of the received firmware.

SUMMARY

The image forming system according to the present disclosure is an image forming system that includes an image forming apparatus capable of directly connecting an external device and a server for maintaining and managing the image forming apparatus by a remote connection. The server includes an app-installing unit and an internal-data-updating unit. The app-installing unit installs an application for updating internal data of the external device in the image forming apparatus. The internal-data-updating unit causes the image forming apparatus to execute the application installed by the app-installing unit. The image forming apparatus includes an app-acquiring unit and an app-executing unit. The app-acquiring unit acquires the application from the server according to an instruction from the server. The app-executing unit executes the application acquired by the app-acquiring unit and updates the external device to the internal data.

The server according to the present disclosure is a server for maintaining and managing an image forming apparatus capable of directly connecting an external device by a remote connection. The server includes an app-installing unit and an internal-data-updating unit. The app-installing unit installs an application for updating internal data of the external device in the image forming apparatus. The internal-data-updating unit causes the image forming apparatus to execute the application installed by the app-installing unit and update the internal data.

The image forming apparatus according to the present disclosure is an image forming apparatus capable of directly connecting an external device. The image forming apparatus includes an app-acquiring unit and an app-executing unit. The app-acquiring unit acquires an application for updating internal data of the external device according to an instruction from a server that maintains and manages the apparatus itself by remote connection. The app-executing unit executes the application acquired by the app-acquiring unit and updates the external device to the internal data.

DETAILED DESCRIPTION

<Embodiment>
[System Configuration of Image Forming System X)

Figure 1:
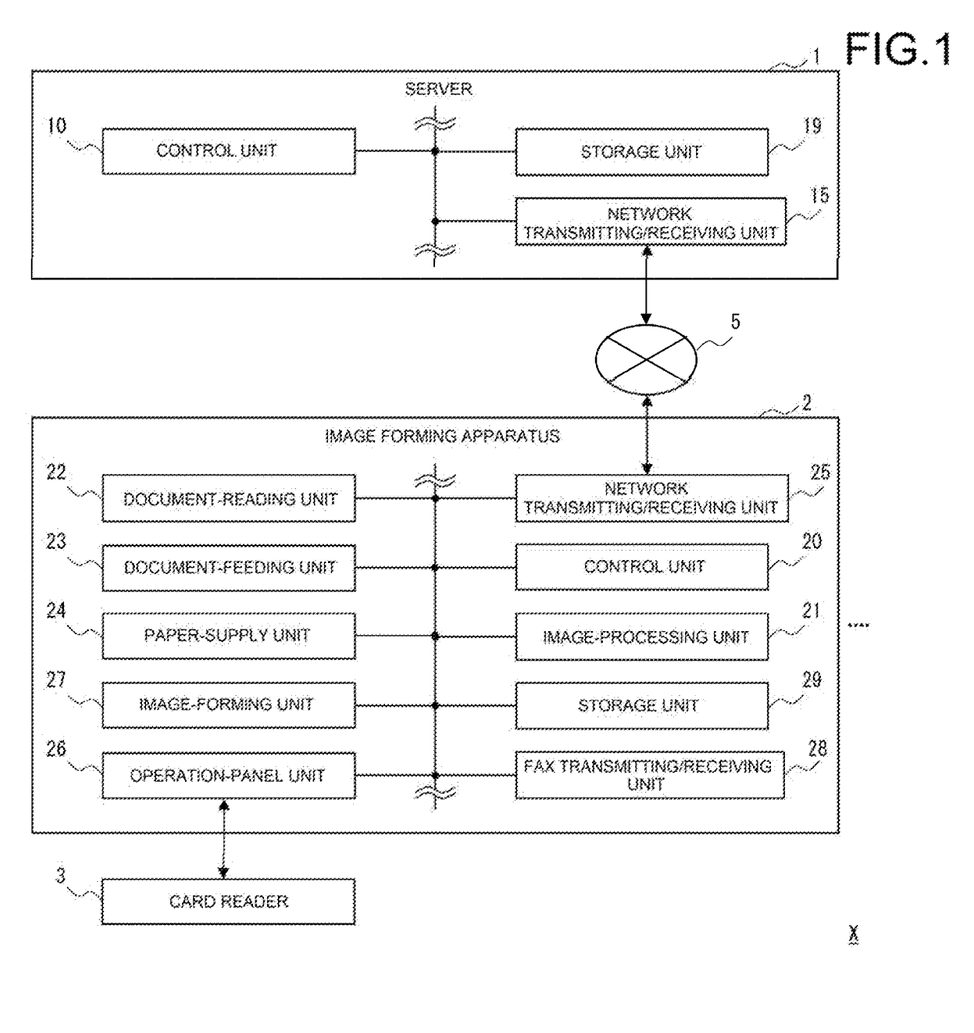
FIG. 1 is a system configuration diagram of an embodiment of an image forming apparatus according to the present disclosure.

First, the system configuration of the image forming system X of an embodiment according to the present disclosure will be described with reference to FIG. 1.

The image forming system X of the present embodiment is configured such that a server 1 and an image forming apparatus 2 are connected via a network 5. In addition, a card reader 3, which is an external device, is directly connected to the image forming apparatus 2 of the present embodiment.

The server 1 is an information processing apparatus such as a PC (Personal Computer), a general-purpose machine or the like. The server 1 maintains and manages the image forming apparatus 2 by remote connection, and performs billing, maintenance, service correspondence, and the like of a user who uses the image forming apparatus 2. With regard to this billing, the server 1 can perform billing for each user based on the information of a card read by the card reader 3 connected to the image forming apparatus 2. Therefore, the server 1 executes the management program on a general-purpose server OS (Operating System). In addition, the server 1 installs a specific application (Application Software, hereinafter simply referred to as an "app") in a specified image forming apparatus 2 as maintenance. It is possible to cause the image forming apparatus 2 to execute the app and further to delete (uninstall) the app from the image forming apparatus 2.

Moreover, the server 1 may grasp the environment of the customer's image forming apparatus 2 and grasp the user's information. Furthermore, the server 1 may be a server that executes "pull printing" in an Intranet network and manages jobs such as printing and the like.

In addition, the server 1 may execute image processing, OCR (Optical Character Recognition) processing, classification processing, transmission processing to an e-mail or shared folder (document box, storage folder), to a DMS (Document Management System) for business or office, and the like.

The image forming apparatus 2 is a document apparatus such as an MFP, a network scanner, a document scanner, a network FAX, a printer with a scanner function, a single function printer, or the like that is installed in a customer environment. In addition, the image forming apparatus 2 can install, execute, and uninstall apps in accordance with an instruction from the server 1. The image forming apparatus 2 may be capable of executing, for example, an app 300 for updating the internal data 400 (refer to FIG. 2) of the card reader 3, a client app for authentication permission, an app for maintenance management, and the like.

Moreover, the image forming apparatus 2 is connected to the server 1 via the network 5. Furthermore, the image forming apparatus 2 is directly connected to the card reader 3 by a USB connection, a serial connection, a parallel connection, or the like.

The card reader 3 is an example of an external device directly connected to the image forming apparatus 2. In other words, the card reader 3 of the present embodiment is not connected to the network 5. In addition, in the present embodiment, an example will be described in which the card reader 3 is a card reader for reading a card for user authentication. Moreover, the card reader 3 of the present embodiment may be, for example, an RFID reader of the TWN 4 standard that is frequently used in European countries. Furthermore, the card reader 3 may include a microprocessor, a field-programmable gate array (FPGA), an EEPROM, a flash memory, and the like for reading a card. Here, the card reader 3 sometimes has to be able to read different cards for each customer. In that case, it is necessary to update (update, customize) the internal data 400 (refer to FIG. 2) from the standard data according to the customer environment.

The network 5 is a network such as an Intranet such as a LAN (Local Area Network) or the like, a WAN (Wide Area Network) or the like such as the Internet, a mobile phone network or the like.

The server 1 and each image forming apparatus 2 may be connected to the network 5 via a router, a gateway, or the like. In addition, the network 5 may constitute a VPN (Virtual Private Network).

Moreover, the server 1 includes a control unit 10, a network transmitting/receiving unit 15, and a storage unit 19. Each unit of the server 1 is connected to the control unit 10, and the operation of the units is controlled by the control unit 10.

The control unit 10 is an information-processing unit such as a GPP (General Purpose Processor), a CPU (Central Processing Unit), an MPU (Micro Processing Unit), a DSP (Digital Signal Processor), a GPU (Graphics Processing Unit), an ASIC (Application Specific Integrated Circuit) and the like.

The control unit 10 reads a control program stored in a ROM, a SSD, or a HDD of the storage unit 19, develops the control program in the RAM, and executes the control program to operate as each unit of a functional block described later.

Incidentally, the control unit 10 may be internally equipped with a RAM, a ROM, a flash memory, or the like.

The network transmitting/receiving unit 15 is a network-connection unit including a LAN board, a wireless transceiver, or the like for connecting to the network 5.

The storage unit 19 is a non-transitory recording medium. The storage unit 19 may include a semiconductor recording medium such as a RAM (Random Access Memory), a ROM (Read Only Memory), an eMMC (embedded Multi Media Card), a SSD (Solid State Drive), or the like, a HDD (Hard Disk Drive), or the like. In addition, the storage unit 19 stores a control program for performing operation control of the server 1.

Moreover, the storage unit 19 may include an area for a document box (storage folder, shared folder) for each user.

The image forming apparatus 2 includes a control unit 20, an image-processing unit 21, a document-reading unit 22, a document-feeding unit 23, a paper-supply unit 24, a network transmitting/receiving unit 25, an operation-panel unit 26, an image-forming unit 27, a FAX transmitting/receiving unit 18, a storage unit 29, and the like. Each unit of the image forming apparatus 2 is connected to the control unit 20, and the operation of each unit is controlled by the control unit 20.

The control unit 20 is an information-processing unit such as GPP, CPU, MPU, DSP, GPU, ASIC or the like.

The control unit 20 reads the control program stored in the ROM or the HDD of the storage unit 29, develops the control program in the RAM, and executes the control program to operate as each unit of a functional block described later. In addition, the control unit 20 performs overall control of the apparatus in accordance with a specific instruction inputted from an external terminal or the operation panel unit 26.

The image-processing unit 21 is an information-processing unit such as a DSP, GPU or the like. The image-processing unit 21 performs specific image processing on image data. For example, the image-processing unit 21 performs various kinds of image processing such as enlargement/reduction, density adjustment, gradation adjustment, image improvement, and the like.

The image-processing unit 21 stores an image read by the document-reading unit 22 as document data in the storage unit 29. When doing that, the image-processing unit 21 can convert printing data into file units of a format such as PDF, TIFF, or the like.

The document-reading section 22 reads (scans) a set document. In addition, the document-reading unit 22 is arranged above the main body of the image forming apparatus 2.

The document-reading unit 22 includes a scanner, a platen glass, and a document-reading slit. In the case of reading a document placed on the platen glass, the document reading unit 22 moves the scanner to a position facing the platen glass, reads the document placed on the platen glass while scanning, acquires image data, and stores the acquired image data in the storage unit 29.

Moreover, in the case of reading a document that is fed from the document-feeding unit 23, the document-reading unit 22 moves the scanner to a position facing the document reading slit. Then, the document-reading unit 22 reads the document via the document-reading slit in synchronization with the document-conveying operation by the document-feeding unit 23, and acquires image data. The document-reading unit 22 stores the acquired image data in the storage unit 29.

The document-feeding unit 23 conveys a document to be read by the document-reading unit 22. The document-feeding unit 23 is arranged in the upper portion of the document-reading unit 22.

The document-feeding unit 23 includes a document-placement unit and a document-conveying mechanism. The document-feeding unit 23 sequentially feeds documents placed on the document-placement unit one by one by the document-conveying mechanism and feeds the documents to the document-reading unit 22.

The paper-supply unit 24 is a unit for feeding recording paper one by one toward the image-forming unit 27. The paper-supply unit 24 is provided in the main unit.

The network transmitting/receiving unit 25 is a network-connection unit including a LAN board, a wireless transceiver, and the like for connecting to the network 5.

The network transmitting/receiving unit 25 transmits and receives data on a data-communication line, and transmits and receives voice signals on a voice telephone line.

The operation-panel unit 26 is arranged on the front side of the image forming apparatus 2. The operation-panel unit 26 includes an input unit such as buttons, a touch panel and the like and a display unit such as an LCD (Liquid Crystal Display), an organic EL display, or the like. Of these, the buttons of the input unit include buttons such as a numeric key pad, a start button, a cancel button, buttons for switching the operation mode, and buttons for giving instructions related to the execution of a job or the like. The operation mode may include various modes such as for copying, facsimile transmission, scanner, network scanner and the like. In addition, the input unit acquires instructions from the user for output settings of various jobs of the image forming apparatus 2. Moreover, it is also possible to input and change the information of each user according to a user instruction acquired from the input unit.

Furthermore, the operation-panel unit 26 includes a USB terminal and the like, and may be connectable with a USB memory, a card reader 3, or the like.

The image-forming unit 27 causes image formation of document data or the like that is stored in the storage unit 29, read by the document-reading unit 22, or acquired from an external terminal to be performed on recording paper.

The image-forming unit 27 includes a photosensitive drum, an exposing unit, a developing unit, a transferring unit, a fixing unit, and the like. The image-forming unit 27 records a toner image on recording paper by executing an image forming process that includes charging, exposing, developing, transferring, and fixing.

A FAX transmitting/receiving unit 28 performs transmission and reception of facsimiles. The FAX transmitting/receiving unit 28 can receive a facsimile from another FAX apparatus via a voice line, store it in the storage unit 29, and cause the image-forming unit 27 to form an image.

In addition, the FAX transmitting/receiving unit 28 can convert document data acquired from the server 1, a document read by the document-reading unit 22, or data of a network FAX transmitted from an external terminal into image data, and perform facsimile transmission the image data to another FAX apparatus via a voice line.

The storage unit 29 is a storage unit that uses a semiconductor recording medium such as a RAM, a ROM, a flash memory, or the like, or a non-transitory recording medium such as an HDD or the like.

A control program for performing operation control of the image forming apparatus 2 is stored in the ROM, the flash memory, the HDD or the like of the storage unit 29. This control program includes an OS and various apps. Of these apps, the installation, execution, and uninstallation of various apps may be managed by the server 1. In other words, in the default state (initial state) of the image forming apparatus 2, various apps are not required to be installed.

In addition to this, the storage unit 29 may also store account settings of a user. Moreover, the storage unit 29 may also include a document box area for each user.

Incidentally, a plurality of image forming apparatuses 2 may be connected on the network 5.

Moreover, in the image forming apparatus 2, the control unit 20 and the image-processing unit 21 may be integrally formed like a CPU or the like with built-in GPU or a chip-on-module package.

Furthermore, the control unit 20 and the image-processing unit 21 may also be internally equipped with a RAM, a ROM, a flash memory, or the like.

[Functional Configuration of the Image Forming System X]

Figure 2:
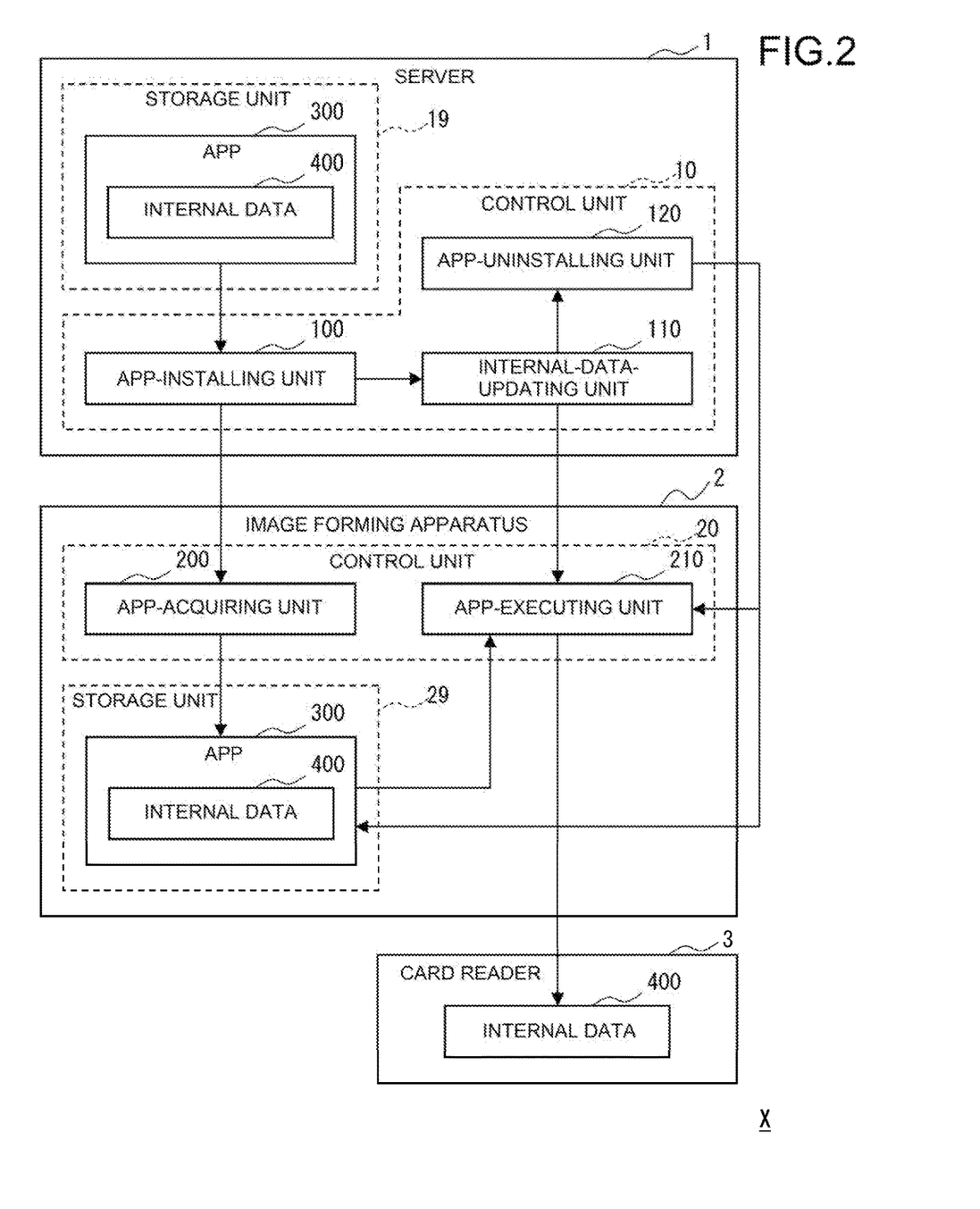
FIG. 2 is a block diagram illustrating a control configuration of the image forming system illustrated in FIG. 1.

Here, the functional configuration of the image forming system X will be described with reference to FIG. 2.

The control unit 10 of the server 1 includes an app-installing unit 100, an internal-data-updating unit 110, and an app-uninstalling unit 120.

The storage unit 19 of the server 1 stores the app 300.

The control unit 20 of the image forming apparatus 2 includes an app-acquiring unit and an app-executing unit.

The storage unit 29 of the image forming apparatus 2 temporarily stores the app 300.

The app-installing unit 100 installs the app 300 for updating the internal data 400 of the card reader 3 in the image forming apparatus 2. The app-installing unit 100 may perform an instruction for installing this app 300. This is by the functions of a common platform, middleware, library, DLL (Dynamic Link Library), or the like (hereinafter referred to as "common library, or the like") that control various apps 300 in the image forming apparatus 2.

The internal-data-updating unit 110 causes the image forming apparatus 2 to execute the app 300 installed by the app-installing unit 100. The internal-data-updating unit 110 may instruct the image forming apparatus 2 to perform this execution using the above-described common library or the like.

The app-uninstalling unit 120 uninstalls the app 300 from the image forming apparatus 2 after the pre-update internal data of the card reader 3 is updated to the internal data 400. The app-uninstalling unit 120, by the above-described common library or the like, may instruct the image forming apparatus 2 to uninstall the app.

The app-acquiring unit 200 acquires the app 300 from the server 1 according to an instruction from the server 1. The app-acquiring unit 200 may acquire the app 300 by downloading the app 300 from the server 1.

The app-executing unit 210 executes the app 300 acquired by the app-acquiring unit 200 and updates the pre-update internal data of the card reader 3 to the internal data 400 included in the app 300.

The app 300 is a dedicated app for updating the pre-update internal data of the card reader 3. The app 300 may be binary data or script data that can be installed and executed by the image forming apparatus 2. In addition, in the present embodiment, this app 300 includes internal data 400 for updating. Moreover, the app 300 may be transmitted to the image forming apparatus 2 in a compressed or encrypted state.

The internal data 400 is internal data for updating and stored in a recording medium such as an EEPROM, flash memory or the like of the card reader 3. The internal data 400 may be, for example, firmware and/or script data of the card reader 3. This firmware may include a microprocessor control program, a microcode, an FPGA code, and the like for reading the card by the card reader 3, and data. In addition, the script data may include character data (script) for authenticating a card. Moreover, the internal data 400 may include data such as an encryption key or the like.

Here, by executing the control program stored in the storage unit 19, the control unit 10 of the server 1 functions as the app-installing unit 100, the internal-data-updating unit 110, and the app-uninstalling unit 120.

In addition, by executing the control program stored in the storage unit 29, the control unit 20 of the image forming apparatus 2 functions as the app-acquiring unit 200 and the app-executing unit 210.

Moreover, each unit of the above-described server 1 and the image forming apparatus 2 is a hardware resource for executing the image forming method of the present disclosure.

Note that a part or an arbitrary combination of the above-described functional configuration may be configured as hardware such as an IC, programmable logic, FPGA, or the like.

[Internal Data Update Process by Image Forming System X]

Figure 3:
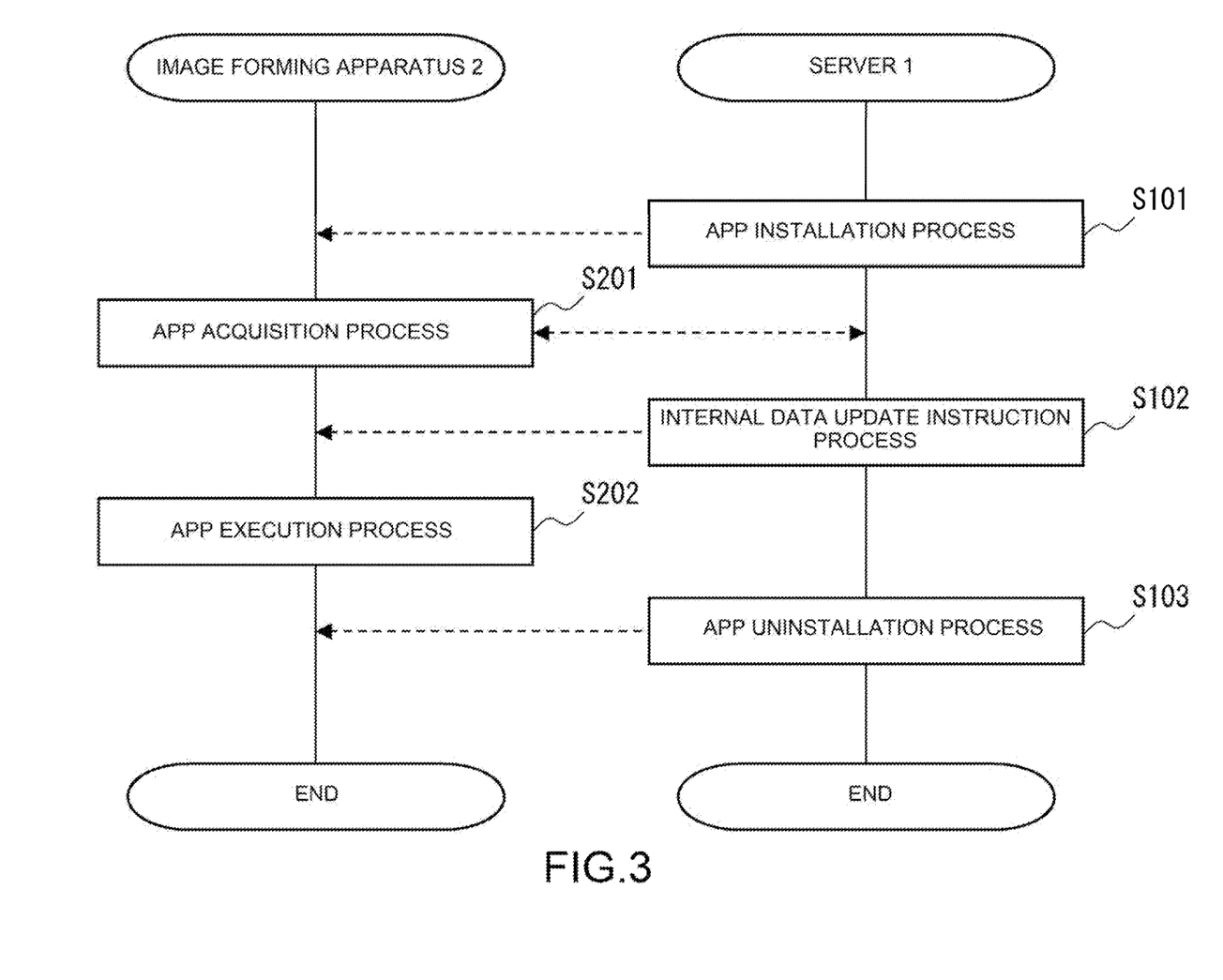
FIG. 3 is a flowchart of an internal data update process of an embodiment according to the present disclosure.

Next, an internal data update process by the image forming system X of an embodiment according to the present disclosure will be described with reference to FIGS. 3 to 4D.

In the internal data update process of this embodiment, first, the app 300 is installed in the image forming apparatus 2 according to an instruction from the server 1. When doing that, the image forming apparatus 2 acquires the app 300 from the server 1. Next, the server 1 causes the image forming apparatus 2 to execute the installed app 300. As a result, the acquired app 300 is executed by the image forming apparatus 2. Then, the card reader 3 is updated to the internal data 400.

The internal data update process according of the present embodiment is a process in which mainly the control unit 10 of the server 1 executes a program stored in the storage unit 19, and the control unit 20 of the image forming device 2 executes a program stored in the storage unit 29 of the image forming apparatus 2 using hardware resource and cooperating with each unit.

Hereinafter, the details of the internal data update process will be described step by step with reference to the flowchart of FIG. 3.

(Step S101)

First, the app-installing unit 100 of the server 1 performs an app installation process.

Figure 4A:
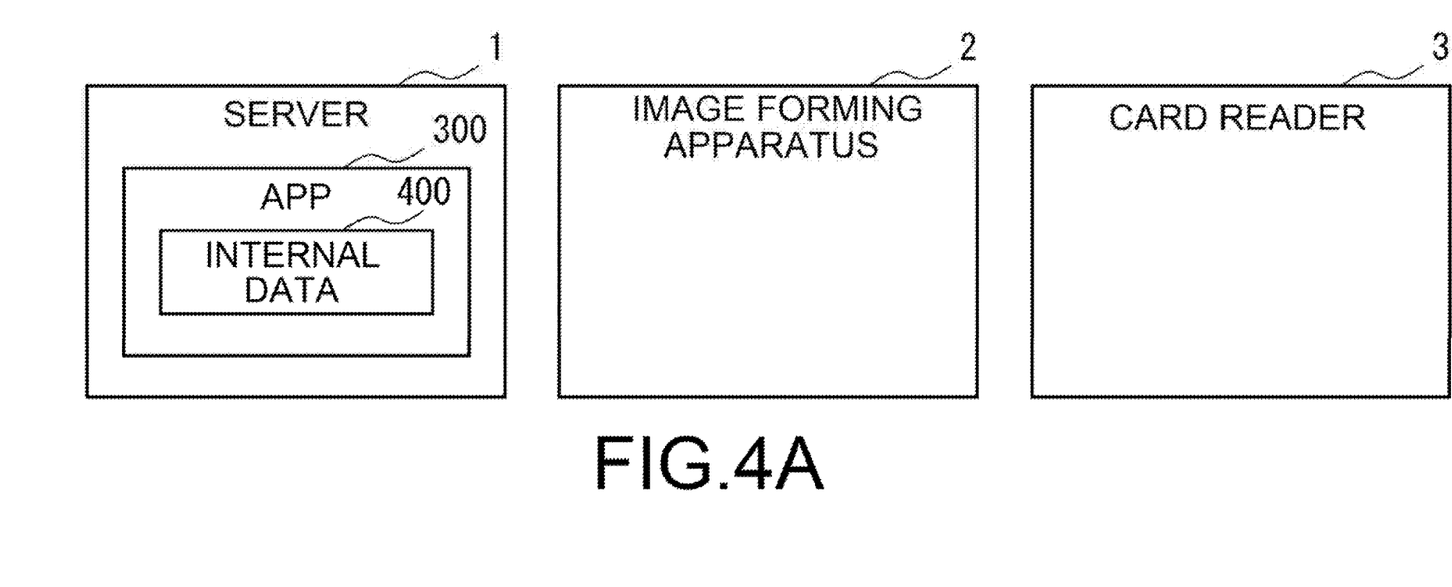
FIG. 4A is a concept diagram of the internal data update process illustrated in FIG. 3.

According to FIG. 4A, according to an instruction from an administrator who operates a terminal or the like, the app-installing unit 100 selects an image forming apparatus 2 that requires an update of the internal data 400 of the card reader 3.

Then, the app-installing unit 100 logs in to the image forming apparatus 2 and transmits a command for installing the app 300 by the WSDL protocol or the like.

As a result, installation of the app 300 is started in the image forming apparatus 2.

(Step S201)

Next, the app-acquiring unit 200 of the image forming apparatus 2 performs an app acquisition process.

Figure 4B:
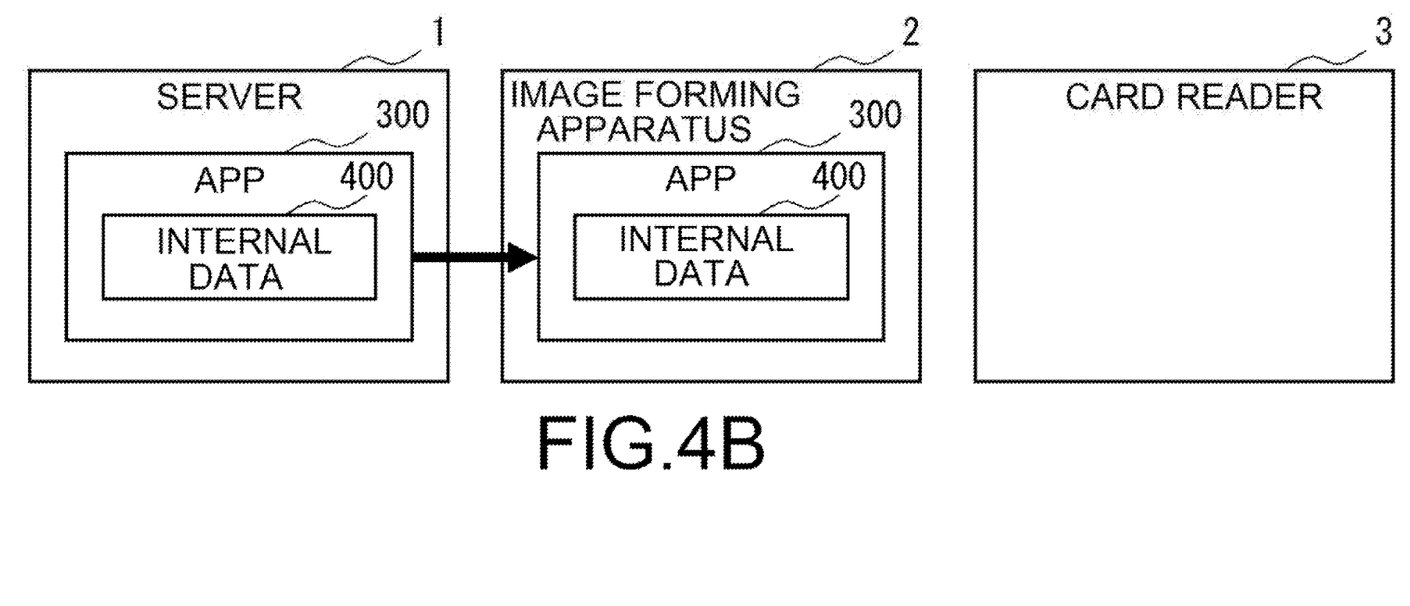
FIG. 4B is a concept diagram of the internal data update process illustrated in FIG. 3.

According to FIG. 4B, upon acquiring the command from the server 1 for installing the app 300, with this as an instruction, the app-acquiring unit 200 acquires the app 300 from the server 1 by downloading or the like and stores the app 300 in the HDD, flash memory or the like of the storage unit 29.

When doing that, the app-acquiring unit 200 may acquire the current information of the card reader 3 and transmit that information to the server 1 so that the server 1 may select the appropriate internal data 400. The current information of the card reader 3 may be a manufacturing vender of the card reader 3, a product ID, a product name, a type of the card reader, a vendor name, information included in the pre-update internal data, and the like.

Moreover, after storing the app 300, the app-acquiring unit 200 may perform various settings of this app 300.

(Step S102)

Next, the internal-data-updating unit 110 of the server 1 performs an internal data update instruction process.

The internal-data-updating unit 110 confirms that the app 300 has been installed in the image forming apparatus 2 and issues an instruction for the image forming apparatus 2 to execute the app 300. As a result, the app 300 is executed by the image forming apparatus 2 as described below.

(Step S202)

Next, the app-executing unit 210 of the image forming apparatus 2 performs an app execution process.

Figure 4C:
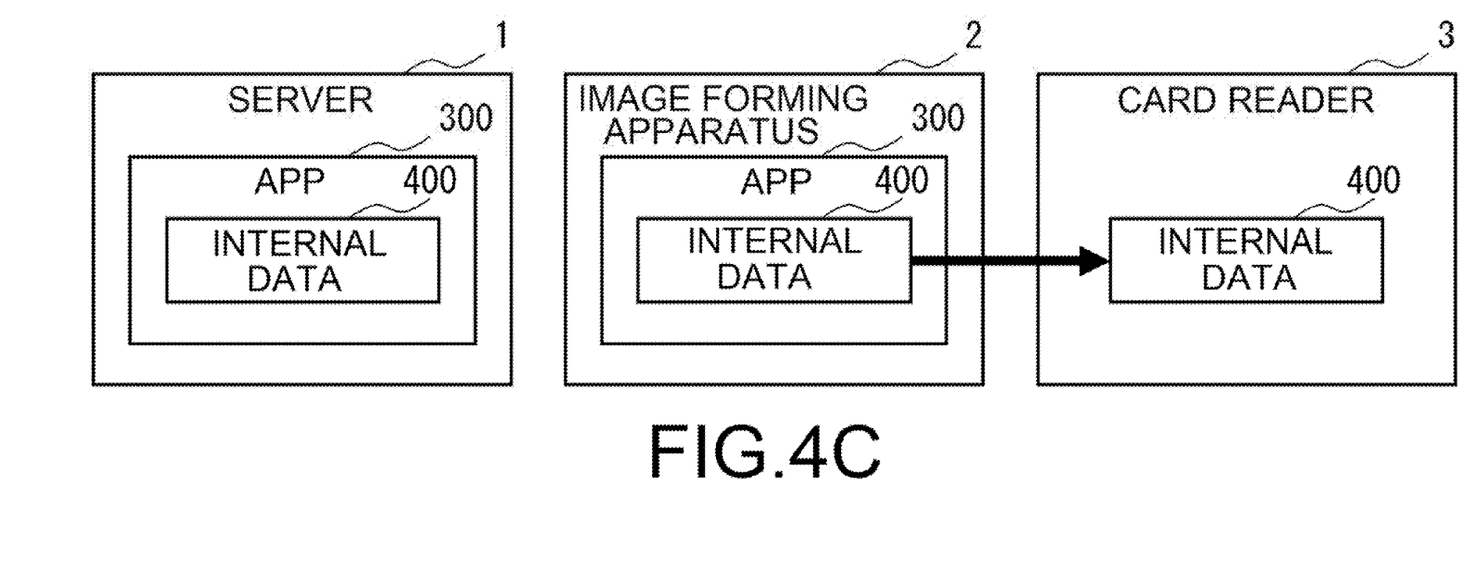
FIG. 4C is a concept diagram of the internal data update process illustrated in FIG. 3.

According to FIG. 4C, the app-executing unit 210 develops the app 300 stored in the HDD, the flash memory, or the like of the storage unit 29 in the RAM and executes the app 300.

As a result, the app-executing unit 210 transmits a command to the card reader 3 for updating the internal data 400, and further transmits the internal data 400 and causes the internal data 400 to be updated.

(Step S103)

Next, the app-uninstalling unit 120 of the server 1 performs an app uninstallation process.

Figure 4D:
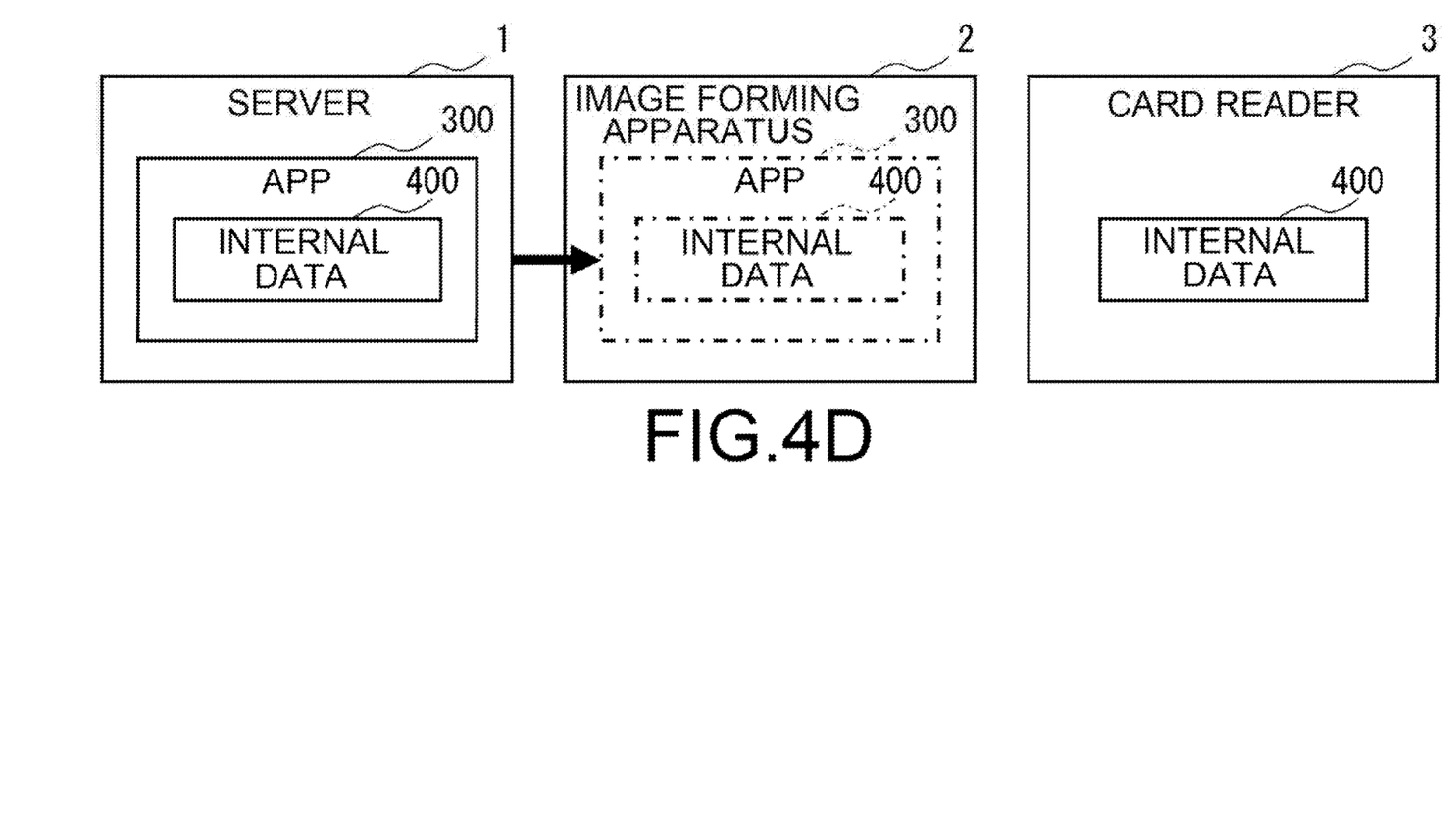
FIG. 4D is a concept diagram of the internal data update process illustrated in FIG. 3.

According to FIG. 4D, upon confirming that the internal data 400 of the card reader 3 has been updated, the app-uninstalling unit 120 gives an instruction to uninstall the app 300 from the image forming apparatus 2. After receiving this instruction, the image forming apparatus 2 uninstalls the app 300 stored in the storage unit 29.

This ends the internal data update process of this embodiment according to the present disclosure.

With the configuration described above, the following effects can be obtained.

Conventionally, when performing shipping or the like of an image forming system to a customer environment, it was impossible to update firmware, scripts, and the like of a card reader according to instructions from a server that performs billing, maintenance management and the like. Therefore, in order to update internal data of the card reader for a specific customer, it is necessary for a serviceperson to directly operate the image forming apparatus. In this case, it is necessary for the serviceperson to manually perform the work of connecting a USB memory or the like to the image forming apparatus, installing an app or the like for updating, and updating internal data of the card reader using the stored internal data. For this reason, in the case of a customer with a large-scale purchase, it is necessary to update internal data of card readers connected to a large number of image forming apparatuses, which takes time and labor, and requires labor costs. Therefore, a technique for updating the internal data of a card reader according to an instruction from a server performing maintenance management is desired. However, as in the above-described typical technique, in a technique in which a firmware update program is installed from the beginning and firmware is simply downloaded, it is not possible to handle a case as described above, requiring updating of different internal data for each customer environment.

On the other hand, the image forming system X of an embodiment according to the present disclosure is an image forming system that includes an image forming apparatus 2 capable of directly connecting with an external device, and a server 1 for maintaining and managing the image forming apparatus 2 by a remote connection. The server 1 includes an app-installing unit 100 for installing an app 300 in the image forming apparatus 2 for updating internal data 400 of the external device, and an internal-data-updating unit 110 for causing the image forming apparatus 2 to execute the app 300 installed by the app-installing unit 100. The image forming apparatus 2 includes an app-acquiring unit 200 that acquires the app 300 from the server 1 according to an instruction from the server 1, and an app-executing unit 210 that executes the app 300 acquired by the app-acquiring unit 200 and updates the external device to the internal data 400.

With this kind of configuration, according to an instruction from the server 1, it is possible to uniformly and semi-automatically update the internal data 400 of card readers 3 or the like directly connected to a plurality of image forming apparatuses 2 in accordance with the customer environment. In addition, even in the case of using a special card reader 3 in a customer environment, it is possible to install the app 300 accordingly and update the internal data 400. Moreover, even in the case where the card reader 3 itself is updated or changed after being installed in a customer environment, the internal data 400 becomes capable of being updated according to an instruction from the server 1 without updating the function of the image forming apparatus 2. Therefore, it is possible to reduce time and labor by reducing the work required by a serviceperson, and reduce the cost for support.

In addition, in the image forming system X of an embodiment according to the present disclosure, the server 1 further includes an app-uninstalling unit 120 that uninstalls the app 300 from the image forming apparatus 2 after the external device is updated to the internal data 400.

With this kind of configuration, it is possible to prevent the app 300 from remaining in the storage unit 29 of the image forming apparatus 2 after updating the internal data 400. As a result, the storage area of the storage unit 29 of the image forming apparatus 2 is not used in an unnecessary manner. Moreover, it is possible to reduce the risk or the like of hacking and the like of the card reader 3 or the like by analyzing the app 300 by a malicious user or the like. In addition, since the app 300 is uninstalled according to an instruction from the server 1, it is possible to reduce the time and labor of a serviceperson.

Furthermore, in the image forming system X of an embodiment according to the present disclosure, the external device is a card reader 3 that reads a card for user authentication, and the internal data 400 is firmware and/or script data of the card reader 3.

With this kind of configuration, the firmware and/or script data of the card reader connected to the image forming apparatus 2 can be updated mostly automatically in accordance with the customer environment.

[Other Embodiments]

In the above embodiment, an example in which there is one type of internal data 400 included in the app 300 is described.

However, configuration may be such that a plurality of types of internal data 400 corresponding to a plurality of external devices may be included in the app 300, and the internal data 400 may be updated to appropriate internal data 400 corresponding to the type of connected external device. In addition, firmware of the image forming apparatus 2 itself, device driver of the external device, and the like may be included in the app 300 and updated in accordance with the customer environment.

With such a configuration, even in a customer environment in which several different external devices are connected, it is possible to update the corresponding internal data 400. Moreover, it is also possible to automatically perform the setting of the image forming apparatus 2 almost at the same time. Therefore, it is possible to reduce the support cost by reducing time and labor required for updating.

In addition, in the above-described embodiment, an example is described in which the internal data 400 is firmware and/or script. However, it is also possible to update internal data other than these, for example, encryption keys, clock data, apps of external devices other than firmware, and the like. Moreover, it is possible to include only firmware as internal data 400. Furthermore, a configuration is also possible in which only the script is updated as the internal data 400.

In addition, a configuration is also possible for updating the internal data 400 of an external device other than the card reader 3. For example, the external device may be a device or the like (hereinafter referred to as "billing device or the like") that bills a card with a coin vendor, NFC (Near Field Communication) or the like, connection device for various kinds of electronic money, credit cards, or the like. Moreover, besides these, the external device may be a biometric authentication device, a network camera, an entry and exit management device, or the like.

With this kind of configuration, internal data 400 of an external device connected to the image forming apparatus 2 can be flexibly changed by an instruction from the server 1. Therefore, the support cost can be reduced.

An external device such as a card reader and the like is provided according to the customer's environment. Therefore, the image forming apparatus normally does not include an application or the like for updating the firmware or the like of the external device.

However, the above-described typical technique cannot be applied to an image forming apparatus in which an application or the like for updating the firmware or the like of the external device is not installed in this manner.

According to the present disclosure, a server that maintains and manages an image forming apparatus by a remote connection causes an application for updating internal data of an external device to be installed in the image forming apparatus and to be executed. Then, the image forming apparatus executes the application and updates the internal data of the external device. As a result, it is possible to provide an image forming system capable of updating internal data even in a state in which an application or the like for updating the firmware or the like of an external device is not installed in an image forming apparatus.

In addition, the technique according to the present disclosure can also be applied to information processing apparatuses other than an image forming apparatus. For example, configuration is possible in which a network scanner, a server or the like that separately connects a scanner by USB or the like is used.

Moreover, needless to say, the configuration and operation of the above-described embodiments are examples and can be appropriately changed and executed within a range that does not depart from the gist of the present disclosure.

What is claimed is:

1. An image forming system that includes an image forming apparatus capable of directly connecting an external device and a server for maintaining and managing the image forming apparatus by a remote connection; wherein
the server comprises:
an app-installing unit that installs an application for updating internal data of the external device in the image forming apparatus; and
an internal-data-updating unit for causing the image forming apparatus to execute the application installed by the app-installing unit;
the image forming apparatus comprises:
an app-acquiring unit that acquires the application from the server according to an instruction from the server; and
an app-executing unit that executes the application acquired by the app-acquiring unit and updates the external device to the internal data; and
the server further comprises:
an app-uninstalling unit that uninstalls the application from the image forming apparatus after the external device is updated to the internal data.

2. The image forming system according to claim 1, wherein
the external device is a card reader that reads a card for user authentication; and
the internal data is firmware and/or script data of the card reader.

3. A server for maintaining and managing an image forming apparatus capable of directly connecting an external device by a remote connection, the server comprising:
an app-installing unit that installs an application for updating internal data of the external device in the image forming apparatus;
an internal-data-updating unit for causing the image forming apparatus to execute the application installed by the app-installing unit and update the internal data; and
an app-uninstalling unit that uninstalls the application from the image forming apparatus after the external device is updated to the internal data.

* * * * *